United States Patent
Matsuzono et al.

(10) Patent No.: US 8,344,093 B2
(45) Date of Patent: Jan. 1, 2013

(54) PRODUCTION METHOD OF ALIPHATIC POLYESTER

(75) Inventors: Shinichiro Matsuzono, Yokkaichi (JP); Toshiyuki Hamano, Yokkaichi (JP); Hiromichi Matsui, Yokkaichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 131 days.

(21) Appl. No.: 12/935,121

(22) PCT Filed: Mar. 23, 2009

(86) PCT No.: PCT/JP2009/055674
§ 371 (c)(1),
(2), (4) Date: Sep. 28, 2010

(87) PCT Pub. No.: WO2009/119511
PCT Pub. Date: Oct. 1, 2009

(65) Prior Publication Data
US 2011/0028678 A1 Feb. 3, 2011

(30) Foreign Application Priority Data
Mar. 28, 2008 (JP) .................. 2008-088314

(51) Int. Cl.
*C08G 63/16* (2006.01)
*C08G 63/02* (2006.01)
(52) U.S. Cl. ....................... 528/302; 528/272
(58) Field of Classification Search .............. 528/272, 528/302
See application file for complete search history.

(56) References Cited

FOREIGN PATENT DOCUMENTS

| JP | 08-073582 | * | 3/1996 |
|----|-----------|---|--------|
| JP | 09-095466 | * | 4/1997 |
| JP | 9 95466 | | 4/1997 |
| JP | 2004 162053 | | 6/2004 |
| JP | 3755426 | | 3/2006 |
| JP | 2007-009145 | * | 1/2007 |
| JP | 2007 9154 | | 1/2007 |
| JP | 2008 1798 | | 1/2008 |
| JP | 2008 45117 | | 2/2008 |

OTHER PUBLICATIONS

BASF Technical Publication "1,4-Butanediol, Storage and handling", 2001.*
International Search Report issued Jun. 30, 2009 in PCT/JP09/055674 filed Mar. 23, 2009.
Chinese Office Action issued Sep. 19, 2011, in Chinese Patent Application No. 200980110325.2 (with English Translation).
U.S. Appl. No. 12/747,664, filed Aug. 3, 2010, Hoshino, et al.
Chinese Office Action issued Apr. 28, 2012 in Patent Application No. 200980110325.2 with English Translation.
Office Action issued Sep. 26, 2012, in Chinese Patent Application No. 200980110325.2 with English language translation.

* cited by examiner

*Primary Examiner* — Ling Choi
*Assistant Examiner* — Gennadiy Mesh
(74) *Attorney, Agent, or Firm* — Oblon, Spivak, McClelland, Maier & Neustadt, L.L.P.

(57) ABSTRACT

An object of the present invention is to provide a method for efficient continuous production of aliphatic polyester having good quality. The invention relates to a continuous production method of aliphatic polyester, wherein the polyester is obtained through a preparation step of slurry containing aliphatic dicarboxylic acid and aliphatic diol, an esterification reaction step and a polycondensation reaction step, wherein temperature range of the slurry during the preparation step thereof is from the coagulation point of the aliphatic diol to 80° C., and moisture content in the slurry is from 0.01 to 10% by weight.

19 Claims, 3 Drawing Sheets

PRODUCTION METHOD OF ALIPHATIC POLYESTER

TECHNICAL FIELD

The present invention relates to a production method of aliphatic polyester. More particularly, the invention relates to an efficient production method of aliphatic polyester having good quality.

BACKGROUND ART

In recent years, environmental problems are regarded as important, and countermeasures to the problem in depletion of fossil fuel raw material which becomes a raw material of plastics and the problem in environmental load on a global scale of carbon dioxide increase in the atmosphere are required.

Under the background, aliphatic polyester comprising aliphatic dicarboxylic acid and aliphatic diol is the polymer, raw material supply of which becomes unrelated to depletion of fossil fuel raw material and additionally can greatly contribute to carbon dioxide emissions reduction because of absorption of carbon dioxide caused by the growth of plant, and furthermore, which is expected as biodegradable plastics, because the aliphatic dicarboxylic acid as a raw material such as succinic acid or adipic acid can be produced from plant-derived glucose using a fermentation method, and the aliphatic diol as a raw material such as ethylene glycol, propanediol or butanediol can be produced from a plant-derived raw material.

Aliphatic polyester is generally obtained by subjecting aliphatic dicarboxylic acid and aliphatic diol to esterification reaction and melt polycondensation reaction. Those reactions are generally conducted by a batchwise method, a continuous method or a combination of a batchwise method and a continuous method. Of those, in the case of industrially mass-producing, a continuous method is advantageous from productivity, quality stability, economic efficiency and the like. In the embodiment that polyethylene terephthalate, polybutylene terephthalate or the like is mass-produced, a continuous method is predominantly used.

In the case of producing aliphatic polyester by a continuous method, slurry comprising aliphatic dicarboxylic acid and aliphatic diol is generally used as an esterification reaction raw material, and the slurry is continuously supplied to a reaction step, thereby proceeding esterification reaction. In this case, it is important that the slurry is stably supplied to the reaction step, but there is the problem such that the slurry comprising aliphatic dicarboxylic acid and aliphatic diol is frequently instable in, for example, precipitation of aliphatic dicarboxylic acid and slurry viscosity.

Patent Document 1 describes properties of slurry comprising terephthalic acid as aromatic dicarboxylic acid and 1,4-butanediol (hereinafter sometimes referred to as "BG"), and Patent Document 2 describes properties of slurry comprising terephthalic acid and ethylene glycol. However, those patent documents do not describe slurry comprising aliphatic dicarboxylic acid and aliphatic diol.

Patent Document 1: Japanese Patent No. 3755426
Patent Document 2: JP-A-2007-9154

DISCLOSURE OF THE INVENTION

Problems that the Invention is to Solve

The present invention has the problem that stable production can be achieved at the time of the production of aliphatic polyester by stabilizing properties of slurry containing aliphatic dicarboxylic acid and aliphatic diol.

Means for Solving the Problems

As compared with slurry comprising aromatic dicarboxylic acid such as terephthalic acid, and aliphatic diol, slurry comprising aliphatic dicarboxylic acid and aliphatic diol is that precipitation of the aliphatic dicarboxylic acid is liable to be generated, and slurry viscosity, transfer properties and the like are liable to become instable. The present inventors have found that slurry which is stable and has good operability can be obtained by maintaining temperature and moisture content of slurry in specific ranges, and have reached the present invention. That is, the gist of the invention is as follows.

A continuous production method of aliphatic polyester, wherein the polyester is obtained through a preparation step of slurry containing aliphatic dicarboxylic acid and aliphatic diol, an esterification reaction step and a polycondensation reaction step, characterized in that temperature range of the slurry during the preparation step thereof is from the coagulation point of the aliphatic diol to 80° C., and moisture content in the slurry is from 0.01 to 10% by weight.

In this embodiment, it is preferred that molar ratio of the aliphatic diol to the aliphatic dicarboxylic acid in the slurry is from 0.8 to 2.0.

Furthermore, in this embodiment, it is preferred that the aliphatic dicarboxylic acid as the slurry raw material is particles, and its average particle diameter D(50) and particle diameter D(90) in 90% of an accumulated volume percentage curve of particle diameter satisfy the following formulae (1) and (2):

$$1 \leq D(50) \leq 500 \tag{1}$$

$$D(90)/D(50) \leq 2.5 \tag{2}$$

wherein unit of the particle diameter is μm.

Furthermore, in this embodiment, it is preferred that main component of the aliphatic diol is 1,4-butanediol, and main component of the aliphatic dicarboxylic acid is succinic acid.

Advantage of the Invention

According to the present invention, properties of slurry containing aliphatic dicarboxylic acid and aliphatic diol can be stabilized, and stable production can be achieved at the time of the continuous production of aliphatic polyester.

DESCRIPTION OF REFERENCE NUMERALS AND SIGNS

| | |
|---|---|
| 1: | Raw material supply line |
| 2: | Raw material supply line |

-continued

| | |
|---|---|
| 3: | Raw material supply line |
| 4: | Slurry extraction line |
| 5: | Slurry circulation line |
| 6: | Slurry supply line |
| 7: | Slurry extraction line |
| 8: | Slurry circulation line |
| 9: | Slurry supply line |
| 10: | Raw material supply line |
| A: | Slurry preparation tank |
| B: | Slurry storage tank |
| C: | Pump |
| D: | Pump |
| 11: | Catalyst supply line |
| 12: | Extraction line of esterification reaction product |
| 13: | Distillation line |
| 14: | Gas extraction line |
| 15: | Vent line |
| 16: | Condensate line |
| 17: | Extraction line |
| 18: | Circulation line |
| 19: | Extraction line |
| 20: | Extraction line |
| 21: | Circulation line |
| 22: | BG recirculation line |
| 23: | Extraction line |
| 24: | BG and catalyst supply line |
| E: | Esterification reaction tank |
| F: | Rectification column |
| G: | Condenser |
| H: | Tank |
| I: | Extraction pump |
| J, K: | Pump |
| 25, 26, 27: | Vent line |
| 28: | Supply line |
| 29: | Catalyst supply line |
| 30, 31, 32: | Polycondensation reaction product extraction line |
| L: | First polycondensation reaction tank |
| M: | Second polycondensation reaction tank |
| N: | Third polycondensation reaction tank |
| O, P, Q: | Extraction gear pump |
| R, S, T, U: | Filter |
| V: | Die head |
| V: | Rotary cutter |

BEST MODE FOR CARRYING OUT THE INVENTION

Constituents and the like of the present invention are described in detail below, but those are one example of embodiment of the invention, and the invention is not limited to those contents.

The present invention is a continuous production method of aliphatic polyester, wherein the polyester is obtained through a preparation step of slurry containing aliphatic dicarboxylic acid and aliphatic diol, an esterification reaction step and a polycondensation reaction step. Each step may not be a continuous step so long as aliphatic polyester can continuously be produced without particularly impairing the advantage of the invention. Preferably, the next step is conducted following the previous step without interposing a different step therebetween (in the description, called a continuous production method). It is preferred that aliphatic dicarboxylic acid and aliphatic diol are main components, respectively, and it is preferred that at least 85 mol % of the total dicarboxylic acid component constituting the polyester of the invention is aliphatic dicarboxylic acid, and at least 85 mol % of the total diol component constituting the polyester of the invention is aliphatic diol.

<Aliphatic Dicarboxylic Acid Component>

The aliphatic dicarboxylic acid component specifically includes oxalic acid, malonic acid, succinic acid, succinic anhydride, glutaric acid, adipic acid, pimelic acid, suberic acid, azelaic acid, sebacic acid, undecadicarboxylic acid, dodecadicarboxylic acid, dimer acid, hexahydrophthalic acid, hexahydroisophthalic acid and hexahydroterephthalic acid. Of those, succinic acid, succinic anhydride, adipic acid and sebacic acid are preferred from properties of the polyester obtained. Succinic acid and succinic anhydride are particularly preferred. Those may be used as mixtures of two or more thereof. The succinic acid is preferably 50 mol % or more, more preferably 70 mol % or more, and particularly preferably 90 mol % or more, to the whole aliphatic dicarboxylic acid from the standpoints of melting point (heat resistance), biodegradability and dynamic properties of the aliphatic polyester obtained.

As a dicarboxylic acid component other than the aliphatic dicarboxylic acid, an aromatic dicarboxylic acid may be used together. Specific examples of the aromatic dicarboxylic acid include terephthalic acid, isophthalic acid, naphthalenedicarboxylic acid and diphenyldicarboxylic acid. Those may be used alone or as mixtures of two or more thereof in addition to the aliphatic dicarboxylic acid.

Furthermore, as succinic acid, succinic anhydride, adipic acid and the like, compounds obtained from biomass resources utilizing the conventional technologies can be used.

<Aliphatic Diol Component>

The aliphatic diol component specifically includes ethylene glycol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, neopentyl glycol, diethylene glycol, polyethylene glycol, polypropylene glycol, polytetramethylene ether glycol, 1,2-cyclohexanediol, 1,4-cyclohexanediol, 1,2-cyclohexanedimethanol and 1,4-cyclohexanedimethanol. Of those, ethylene glycol, 1,3-propanediol, 1,4-butanediol and 1,4-cyclohexanedimethanol are preferred from properties of the polyester obtained. Those may be used as mixtures of two or more thereof. The 1,4-butanediol is preferably 50 mol % or more, more preferably 70 mol % or more, and particularly preferably 90 mol % or more, to the whole aliphatic diol from the standpoints of melting point (heat resistance), biodegradability and dynamic properties of the aliphatic polyester obtained. Furthermore, as ethylene glycol, 1,3-propanediol, 1,4-butanediol and the like, plant-derived compounds can be used.

<Other Copolymer Component>

Examples of a copolymer component which is other constituent of the polyester of the invention include oxycarboxylic acids such as lactic acid, glycolic acid, hydroxybutyric acid, hydroxycaproic acid, 2-hydroxy-3,3-dimethylbutyric acid, 2-hydroxy-3-methylbutyric acid, 2-hydroxyisocaproic acid, malic acid, maleic acid, citric acid and fumaric acid, esters and lactones of those oxycarboxylic acids, and oxycarboxylic acid polymers; trifunctional or more polyhydric alcohols such as glycerin, trimethylolethane, trimethylolpropane and pentaerythritol; and trifunctional or more polycarboxylic acids or anhydrides thereof, such as propanetricarboxylic acid, pyromellitic acid, trimellitic acid, benzophenonetetracarboxylic acid and their anhydrides. Furthermore, by adding a small amount of trifunctional or more oxycarboxylic acid, trifunctional or more alcohol, trifunctional or more carboxylic acid, or the like, polyester having high viscosity is easy to be obtained. Above all, oxycarboxylic acids such as malic acid, citric acid and fumaric acid are preferably used, and malic acid is particularly preferably used. The trifunctional or more polyfunctional compound is preferably in an amount of from 0.001 to 5 mol %, and more preferably from 0.05 to 0.5 mol %, to the whole dicarboxylic acid component. Where the amount exceeds the upper limit of the above range, gel (unmelted product) is liable to be formed, and where the amount is less than the lower limit of the range, effect of viscosity increase is difficult to be obtained. Furthermore, a chain extender such as an isocyanate compound or carbonate may be contained for the purpose of, for example, further increasing molecular weight.

<Production of Aliphatic Polyester>

The production method of aliphatic polyester in the invention is described below by reference to a continuous production method of aliphatic polyester, but the method of the invention is not limited to this.

As the production method of aliphatic polyester according to the invention, wherein the polyester is continuously obtained from aliphatic dicarboxylic acid and aliphatic diol through a slurry preparation step, an esterification reaction step and a melt polycondensation reaction step in plural continuous reaction tanks, the conventional production method of polyester can be employed, except that temperature of the slurry in the slurry preparation step and moisture content in the slurry are adjusted to specific ranges. By the invention, properties of the slurry are stabilized, and the slurry can continuously be supplied to a reaction system in a stable manner. Thus, the advantage can sufficiently be exhibited in a continuous production method.

Figure 1:
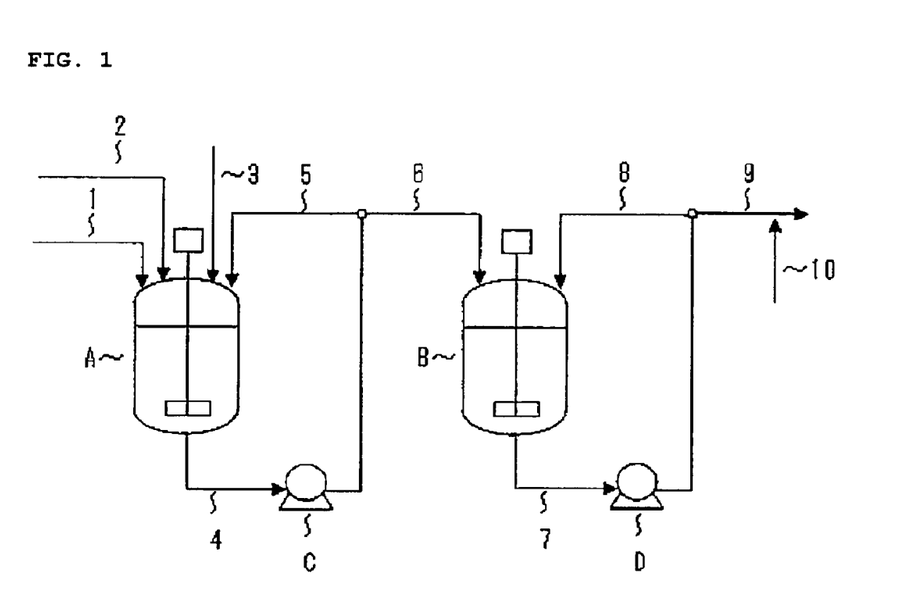
FIG. 1 is a schematic view showing one embodiment of a slurry preparation step in the production method of aliphatic polyester according to the present invention.

In the invention, the slurry preparation step mainly means a step of from (mixing aliphatic dicarboxylic acid, aliphatic diol, and according to need, a polyfunctional compound to obtain slurry) to (transferring the slurry to an esterification reaction step) (as an example, from a preparation tank (A) to a slurry supply line (9) in FIG. 1).

<Slurry Preparation Step>

A jacket type heater which can circulate hot water, heat medium or the like can be used to control temperature of the slurry during the slurry preparation step. Electrical heater can also be used. As the slurry temperature during the slurry preparation step, temperature measured by temperature sensors provided in lower part of a stirring mixing tank, and piping of slurry circulation line, slurry supply line and the like is used as slurry temperature.

The slurry temperature can be controlled by adjusting flow rate of hot water or heat medium in the case of a jacket type so as to become a preset temperature.

The slurry temperature is that the lower limit is generally the coagulation point or more of the aliphatic diol, and the upper limit is 80° C. or lower, preferably 70° C. or lower, further preferably 60° C. or lower, and particularly preferably 50° C. or lower. Where the slurry temperature is lower than the lower limit, the aliphatic diol coagulates, and the slurry cannot stably be supplied. On the other hand, where the slurry temperature exceeds the upper limit, viscosity of the slurry is decreased, thereby increasing precipitation speed of slurry particles. As a result, precipitation separation of solid-liquid is promoted in the tank, and it is difficult to stably supply the slurry. Furthermore, by change with the passage of time of slurry molar ratio and viscosity due to the progress of esterification reaction, it becomes difficult to stably supply the slurry, and deflection of product quality tends to be increased.

The moisture content in the slurry is that the lower limit is generally 0.01% or more, preferably 0.05% or more, and further preferably 0.1% or more, and the upper limit is 10% or less, preferably 5% or less, further preferably 2% or less, particularly preferably 1.5% or less, and most preferably 1% or less. Where the moisture content in the slurry is tried to control to not more than the lower limit, facilities for removing moisture, such as adsorption method, are required, and this is economically disadvantageous. On the other hand, where the moisture content in the slurry exceeds the upper limit, the moisture content carried in the esterification reaction step is increased, scattering matters in the esterification reaction tank are increased, and the scattering matters are adhered and fixed in the vicinity of the slurry supply port. This makes it difficult to stably supply the slurry, and additionally, this may cause generation of foreign matters in a product due to peeling, dropping and the like of scattering matters and long-term retaining materials from layer wall face. The moisture content in the slurry is moisture content carried by dicarboxylic acid and diol raw materials, and by-product water owing to the progress of esterification reaction due to high slurry temperature or long retention time during the slurry preparation step, and therefore can be adjusted by administration of moisture content in raw materials, and temperature and retention time in the slurry preparation step. The phenomenon that esterification reaction proceeds at slurry temperature of about 80° C. or lower is not mostly observed in slurry of aromatic dicarboxylic acid and aliphatic diol, and is characteristic in slurry of aliphatic dicarboxylic acid and aliphatic diol.

Molar ratio of the aliphatic diol component to the aliphatic dicarboxylic acid component in the slurry is that the lower limit is 0.8, preferably 0.9, and further preferably 1.0, and the upper limit is 2.0, preferably 1.8, further preferably 1.5, particularly preferably 1.3, and most preferably 1.2. Where the molar ratio is less than the lower limit, viscosity of the slurry is increased, and the slurry may not stably be supplied. On the other hand, where the molar ratio exceeds the upper limit, precipitation speed of the slurry is increased, precipitation separation of solid-liquid is promoted in the tank, and it becomes difficult to stably supply the slurry.

Average particle diameter $D(50)$ of the aliphatic dicarboxylic acid particles as a slurry raw material is that the lower limit is 1 µm or more, preferably 10 µm or more, and further preferably 30 µm or more, and the upper limit is 500 µm or less, preferably 400 µm or less, further preferably 200 µm or less, and particularly preferably 100 µm or less. Where the average particle diameter $D(50)$ is smaller than the lower limit, viscosity of the slurry is considerably increased, and the slurry cannot stably be supplied. Additionally, this poses risks of flying of fine powder and dust explosion at the time of handling aliphatic dicarboxylic acid, thus involving difficulty in handling. Where the average particle diameter $D(50)$ exceeds the upper limit, precipitation speed of slurry particles is increased, precipitation separation of solid-liquid is promoted in the tank, and it becomes difficult to stably supply the slurry.

Particle diameter $D(90)$ in 90% of an accumulated volume percentage curve of aliphatic dicarboxylic acid particles as a slurry raw material can be used as an index showing the proportion of large particle diameter part contained in the solid. Where the ratio of $D(90)$ to the average particle diameter $D(50)$ is large, particle size distribution tends to broaden, and where the ratio of $D(90)$ to the average particle diameter $D(50)$ is small, particle size distribution tends to narrow. $D(90)/D(50)$ represented as a ratio between the average particle diameter $D(50)$ and the particle diameter $D(90)$ in 90% of an accumulated volume percentage curve, of aliphatic dicarboxylic acid as a slurry raw material is that the upper limit is 2.5 or less, preferably 2.3 or less, further preferably 2.0 or less, and particularly preferably 1.8 or less. Where the ratio exceeds the upper limit, precipitation speed of slurry particles is increased, precipitation separation of solid-liquid is promoted in the tank, and it becomes difficult to stably supply the slurry. The minimum value of $D(90)/D(50)$ is theoretically 1.0, but the lower limit is generally 1.2. In the present description, the respective particle diameters are measured by a dry method using a laser diffraction particle size distribution measuring device, MASTERSIZER 2000 (manufactured by Sysmex Corporation). A sample is placed on a sample tray, measurement for 2 seconds is carried out three times for one sample, and the average value is defined as an average particle diameter D(50). Furthermore, from the particle size distribution obtained at the time of measurement of the average particle diameter, a particle diameter in 90% of an accumulated volume percentage curve, that is, a particle diameter corresponding to 90% of the total volume when accumulated from the side of small particle size, is defined as D(90).

<Esterification Reaction Step>

The esterification reaction between the dicarboxylic acid component and the diol component can be conducted in plural continuous reaction tanks, but can be conducted in one tank (esterification reaction step). Reaction temperature is that the lower limit is generally 200° C., preferably 210° C., more preferably 215° C., further preferably 218° C., and particularly preferably 233° C., and the upper limit is generally 250° C., preferably 245° C., more preferably 240° C., and particularly preferably 235° C. Where the reaction temperature is lower than the lower limit, esterification reaction rate is slow, the reaction requires long time, and unfavorable reactions such as dehydration decomposition of aliphatic diol are increased. Where the reaction temperature exceeds the upper limit, decomposition of aliphatic diol and aliphatic dicarboxylic acid is increased, and furthermore, scattering matters are increased in the reaction tank, resulting in generation of foreign matters, and turbidity (haze) tends to be generated in the reaction product. It is preferred that esterification temperature is constant temperature. The constant temperature stabilizes the degree of esterification. The constant temperature is preset temperature±5° C., and preferably ±2° C. Reaction atmosphere is generally nitrogen gas atmosphere or inert gas atmosphere such as argon. Reaction pressure is from 50 to 200 kPa. The lower limit is preferably 60 kPa, and further preferably 70 kPa, and the upper limit is preferably 130 kPa, and further preferably 110 kPa. Where the reaction pressure is lower than the lower limit, scattering matters are increased in the tank, haze of reaction product is increased, and this is liable to increase foreign matters. Furthermore, distillation of aliphatic diol into the outside of the reaction system is increased, and this is liable to incur decrease in polycondensation reaction rate. Where the reaction pressure exceeds the upper limit, dehydration decomposition of aliphatic diol is increased, and this is liable to incur decrease in polycondensation rate. Reaction time is generally 1 hour or more, and the upper limit thereof is generally 10 hours or less, and preferably 4 hours or less. Molar ratio of the aliphatic diol component to the aliphatic dicarboxylic acid component, conducting esterification reaction indicates molar ratio of aliphatic diol and esterified aliphatic diol to aliphatic dicarboxylic acid and esterified aliphatic dicarboxylic acid, present in gas phase of the esterification reaction tank and molten reactant phase. Aliphatic dicarboxylic acid, aliphatic diol and their decomposition products, that are decomposed in the reaction system and do not contribute to the esterification reaction are not included. The term "are decomposed and do not contribute to the esterification reaction" means that, for example, tetrahydrofuran which is formed by decomposition of 1,4-butanediol as aliphatic diol is not included in the molar ratio. In the invention, the molar ratio is that the lower limit is 1.10, preferably 1.12, further preferably 1.15, and particularly preferably 1.20, and the upper limit is 2.00, preferably 1.80, further preferably 1.60, and particularly preferably 1.55. Where the molar ratio is less than the lower limit, esterification reaction is liable to be insufficient, polycondensation reaction which is a reaction of a post-step is difficult to proceed, and polyester having high degree of polymerization is difficult to be obtained. Where the molar ratio exceeds the upper limit, decomposition amount of aliphatic diol and aliphatic dicarboxylic acid is increased, which is not preferred. It is a preferable method to appropriately replenish aliphatic diol to esterification reaction system in order to maintain the molar ratio in a preferred range. In the invention, esterification reaction product having a degree of esterification of 80% or more is applied to polycondensation reaction. In the invention, the polycondensation reaction means a reaction for increasing molecular weight of polyester which is conducted under a reaction pressure of 50 kPa or less. The esterification reaction is generally conducted in an esterification reaction tank under a pressure of from 50 to 200 kPa, and the polycondensation reaction is conducted in a polycondensation reaction tank under a pressure of 50 kPa or less, and preferably 10 kPa or less. The degree of esterification used herein indicates the proportion of an esterified acid component to the whole acid components in esterification reaction product sample, and is represented by the following formula:

$$\text{Degree of esterification (\%)}=(\text{saponification value}-\text{acid value})/\text{saponification value}\times 100$$

The degree of esterification of esterification reaction product is preferably 85% or more, further preferably 88% or more, and particularly preferably 90% or more. Where the degree of esterification is not more than the lower limit, polycondensation reactivity as a post-step reaction deteriorates. Furthermore, scattering matters are increased at the time of the polycondensation reaction, and adhered to wall surface, followed by solidification. Additionally, the scattering matters fall down in reaction product, resulting in deterioration of haze (generation of foreign matters). The higher upper limit is preferable for the polycondensation reaction as a post-step reaction, but the upper limit is generally 99%.

Terminal carboxyl group concentration of the esterification reaction product is preferably from 500 to 2,500 equivalents/ton. The lower limit is further preferably 600 equivalents/ton, and particularly preferably 700 equivalents/ton. The upper limit is further preferably 2,000 equivalents/ton, and particularly preferably 1,800 equivalents/ton. Where the concentration is lower than the lower limit, decomposition of aliphatic diol is increased. Where the concentration exceeds the upper limit, the polycondensation reactivity as a post-step reaction deteriorates. Furthermore, scattering matters are increased at the time of the polycondensation reaction, and adhered to wall surface, followed by solidification. Additionally, the scattering matters fall down in reaction product, resulting in deterioration of haze (generation of foreign matters).

In the invention, high quality aliphatic polyester having low haze and reduced foreign matters can efficiently be obtained by conducting continuous reaction such that molar ratio between dicarboxylic acid and diol, reaction temperature, reaction pressure and reaction rate, in the esterification reaction are fallen within the above ranges, and continuously subjecting to polycondensation reaction.

<Polycondensation Reaction Step>

Polycondensation reaction can be conducted under reduced pressure using continuous plural reaction tanks (polycondensation reaction step). Reaction pressure in a final polycondensation reaction tank is that the lower limit is generally 0.01 kPa or more, and preferably 0.03 kPa or more, and the upper limit is generally 1.4 kPa or less, and preferably 0.4 kPa or less. Where pressure at the time of the polycondensation reaction is too high, polycondensation time is prolonged, and due to this, molecular weight decrease and coloration by thermal decomposition of polyester are induced. As a result, production of polyester showing practically sufficient properties tends to be difficult. On the other hand, a production method of polyester using ultra-high vacuum polycondensation facilities is a preferred embodiment from the standpoint of improving polycondensation reaction rate. However, extremely expensive equipment investment is required, which is economically disadvantageous. Reaction temperature is that the lower limit is generally 215° C., and preferably 220° C., and the upper limit is generally 270° C., and preferably 260° C. Where the reaction temperature is lower than the lower limit, polycondensation reaction rate is slow, and long time is required for the production of polyester having high degree of polymerization. Additionally, high powder stirring machine is required, which is economically disadvantageous. On the other hand, where the reaction temperature exceeds the upper limit, thermal decomposition of polyester is liable to be incurred at the time of production, and the production of polyester having high degree of polymerization tends to be difficult. Reaction time is that the lower limit is generally 1 hour or more, and the upper limit is generally 15 hours or less, preferably 10 hours or less, and more preferably 8 hours or less. Where the reaction time is too short, reaction is insufficient, polyester having high degree of polymerization is difficult to be obtained, and mechanical properties of its molded article tend to be deteriorated. On the other hand, where the reaction time is too long, decrease in molecular weight due to thermal decomposition of polyester is considerable, and mechanical properties of its molded article tend to be deteriorated. Additionally, amount of terminal carboxyl groups which adversely affect durability of polyester may be increased by thermal decomposition.

<Catalyst>

Esterification reaction and polycondensation reaction are promoted by using a reaction catalyst. In the esterification reaction, sufficient reaction rate can be obtained even though esterification reaction catalyst is not used. Where esterification reaction catalyst is present at the time of esterification reaction, the catalyst generates precipitate which is insoluble in a reaction product by water generated by the esterification reaction, and transparency of the polyester obtained may be impaired (that is, haze is increased), or the catalyst may convert into foreign matter. Therefore, it is preferred that a reaction catalyst is not added and not used during the esterification reaction. Furthermore, when the catalyst is added to a gas phase part of the reaction tank, haze may be increased, or the catalyst may convert into foreign matter. Therefore, it is preferred that the catalyst is added to a molten reactant.

In the polycondensation reaction, the reaction is difficult to proceed in the absence of a catalyst, and it is preferred to use a catalyst. Compounds containing at least one kind of metal elements of groups 1 to 14 of the periodic table are generally used as a polycondensation reaction catalyst. The metal element specifically includes scandium, yttrium, samarium, titanium, zirconium, vanadium, chromium, molybdenum, tungsten, tin, antimony, cerium, germanium, zinc, cobalt, manganese, iron, aluminum, magnesium, calcium, strontium, sodium and potassium. Of those, scandium, yttrium, titanium, zirconium, vanadium, molybdenum, tungsten, zinc, iron and germanium are preferred, and titanium, zirconium, tungsten, iron and germanium are particularly preferred. Furthermore, of the above metals, metal elements of groups 3 to 6 of the periodic table showing Lewis acidity are preferred in order to reduce polyester terminal concentration affecting thermal stability of polyester. The metals specifically include scandium, titanium, zirconium, vanadium, molybdenum and tungsten. In particular, titanium and zirconium are preferred from easy availability, and titanium is further preferred from reaction activity.

In the invention, compounds containing organic group, such as carboxylic acid salts, alkoxy salts, organic sulfonic acid salts or β-diketonate salts, containing those metal elements; inorganic compounds such as oxides or halides of the metals; and mixtures of those are preferably used as the catalyst.

In the invention, the catalyst is preferably a compound which is liquid at the time of polymerization or which dissolves in polyester low polymer or polyester, for the reason that polymerization rate is increased when the catalyst is a molten or dissolved state at the time of polymerization. It is preferred that polycondensation is conducted in the absence of a solvent. Alternatively, a small amount of a solvent may be used to dissolve the catalyst. Solvents for dissolving the catalyst include alcohols such as methanol, ethanol, isopropanol and butanol; diols such as ethylene glycol, butanediol and pentanediol; ethers such as diethyl ether and tetrahydrofuran; nitriles such as acetonitrile; hydrocarbon compounds such as heptane and toluene; water; and their mixtures. The solvent is used in an amount such that catalyst concentration is generally 0.0001% by weight or more and 99% by weight or less.

Titanium compound is preferably tetraalkyl titanate and its hydrolyzate, and specifically includes tetra-n-propyl titanate, tetraisopropyl titanate, tetra-n-butyl titanate, tetra-t-butyl titanate, tetraphenyl titanate, tetracyclohexyl titanate, tetrabenzyl titanate, mixed titanates of those, and hydrolyzates of those. Furthermore, titanium (oxy)acetyl acetonate, titanium tetraacetyl acetonate, titanium diisopropoxide bis(acetyl acetonate), titanium bis(ammonium lactate)dihydroxide, titanium bis(ethyl acetoacetate)diisopropoxide, titanium (triethanol aluminate)isopropoxide, polyhydroxytitanium stearate, titanium lactate, titanium triethanol aluminate, butyl titanate dimer and the like are preferably used. Furthermore, liquid materials obtained by mixing alcohol, alkaline earth metal compound, phosphoric ester compound and titanium compound are used. Of those, tetra-n-propyl titanate, tetraisopropyl titanate, tetra-n-butyl titanate, titanium (oxy)acetyl acetonate, titanium tetraacetyl acetonate, titanium bis(ammonium lactate)dihydroxide, polyhydroxytitanium stearate, titanium lactate, butyl titanate dimer, and liquid materials obtained by mixing alcohol, alkaline earth metal compound, phosphoric ester compound and titanium compound are preferred, tetra-n-butyl titanate, titanium (oxy)acetyl acetonate, titanium tetraacetyl acetonate, polyhydroxytitanium stearate, titanium lactate, butyl titanate dimer and liquid materials obtained by mixing alcohol, alkaline earth metal compound, phosphoric ester compound and titanium compound are more preferred, and tetra-n-butyl titanate, polyhydroxytitanium stearate, titanium (oxy)acetyl acetonate, titanium tetraacetyl acetonate, and liquid materials obtained by mixing alcohol, alkaline earth metal compound, phosphoric ester compound and titanium compound are particularly preferred.

Zirconium compound specifically includes zirconium tetraacetate, zirconium acetate hydroxide, zirconium tris(butoxy)stearate, zirconyl diacetate, zirconium oxalate, zirconyl oxalate, potassium zirconium oxalate, polyhydroxyzirconium stearate, zirconium ethoxide, zirconium tetra-n-propoxide, zirconium tetraisopropoxide, zirconium tetra-n-butoxide, zirconium tetra-t-butoxide, zirconium tributoxyacetyl acetonate, and mixtures of those. Of those, zirconyl diacetate, zirconium tris(butoxy)stearate, zirconium tetraacetate, zirconium acetate hydroxide, ammonium zirconium oxalate, potassium zirconium oxaxlate, polyhydroxyzirconium stearate, zirconium tetra-n-propoxide, zirconium tetraisopropoxide, zirconium tetra-n-butoxide, and zirconium tetra-t-butoxide are preferred; zirconyl diacetate, zirconium tetraacetate, zirconium acetate hydroxide, zirconium tris(butoxy)stearate, ammonium zirconium oxalate, zirconium tetra-n-propoxide, and zirconium tetra-n-butoxide are more preferred; and zirconium tris(butoxy)stearate is particularly preferred for the reason that colorless polyester having high degree of polymerization is easily obtained.

Germanium compound specifically includes inorganic germanium compounds such as germanium oxide or germanium chloride, and organic germanium compounds such as tetraalkoxygermanium. From price and easy availability, germanium oxide, tetraethoxygermanium and tetrabutoxy-germanium are preferred, and germanium oxide is particularly preferred.

Other metal-containing compounds include scandium compounds such as scandium carbonate, scandium acetate, scandium chloride and scandium acetyl acetonate; yttrium compounds such as yttrium carbonate, yttrium chloride, yttrium acetate and yttrium acetyl acetonate; vanadium compounds such as vanadium chloride, vanadium trichloride oxide, vanadium acetyl acetonate and vanadium acetyl acetonate oxide; molybdenum compounds such as molybdenum chloride and molybdenum acetate; tungsten compounds such as tungsten chloride, tungsten acetate and tungstic acid; and lanthanoid compounds such as cerium chloride, samarium chloride and ytterbium chloride.

The amount of the catalyst added in the case of using a metal compound as those polycondensation catalysts is that the lower limit is generally 0.1 ppm by weight or more, preferably 0.5 ppm by weight or more, and more preferably 1 ppm by weight or more, in terms of a metal amount to the polyester formed, and the upper limit is generally 3,000 ppm by weight or less, preferably 1,000 ppm by weight or less, more preferably 250 ppm by weight or less, and particularly preferably 130 ppm by weight or less, in terms of a metal amount to the polyester formed. Where the amount of the catalyst used is too large, such a large amount is economically disadvantageous. Additionally, although the reason is not yet clarified, terminal carboxyl group concentration in polyester may be increased. Therefore, due to the increase in terminal carboxyl group amount and residual catalyst concentration, thermal stability and hydrolysis resistance of polyester may be decreased. On the other hand, where the amount of the catalyst used is too small, polymerization activity is decreased, and thermal decomposition of polyester is induced during the production of polyester. As a result, it is difficult to obtain polyester showing practically useful properties.

Addition position of the catalyst to reaction system is not particularly limited so long as the catalyst is added before the polycondensation reaction step. The catalyst may be added at the time of charging raw materials. However, where the catalyst is co-present in a state that water is present in large amount or is generated, the catalyst deactivates, resulting in precipitation of foreign matters, and quality of product may be impaired. Therefore, it is preferred that the catalyst is added after the esterification reaction step.

<Slurry Preparation Tank and Reaction Tank>

Type of a preparation apparatus and a storage tank apparatus in the slurry preparation step used in the invention is not particularly limited, and conventional apparatuses can be used. For example, a vertical stirring mixing tank and a vertical heat convective mixing tank can be exemplified. In the slurry preparation step, one slurry preparation tank can be used, or plural tanks can be used in which the same kind or different kind of plural tanks are arranged in series as shown in FIG. 1. It is preferred to use plural tanks, and it is preferred that the apparatus is provided with a stirring apparatus and a circulation line.

The type of the stirring apparatus used in the invention can include a reciprocating rotary stirring machine, a jet stirring machine, a propeller stirring machine, a turbine stirring machine and a paddle stirring machine. Stirring blade can include anchor blade, turbine blade, paddle blade and propeller blade. The circulation line is provided with a circulation pump, and may be provided with a jet nozzle.

As the esterification reaction tank used in the invention, the conventional tanks can be used, and the reaction tank can be either of types such as a vertical stirring complete mixing tank, a vertical heat convective mixing tank, a tower continuous reaction tank and the like. Furthermore, the reaction tank may be a single tank or plural tanks comprising the same kind or different kind of tanks arranged in series. Above all, a reaction tank having stirring apparatus is preferred, and as the stirring apparatus, high speed rotary stirring machine such as a turbine stator high speed rotary stirring machine, a disk mill stirring machine and a rotor mill stirring machine can be used, in addition to the ordinary types comprising a power section, a bearing, a shaft and a stirring blade.

Form of stirring is not limited, and a method in which a part of a molten reactant is carried to the outside by piping or the like, and stirred with a line mixer or the like, and the molten reactant is circulated can be used, in addition to the ordinary stirring method of directly stirring a molten reactant in a reaction tank from the upper part, the lower part, a side part or the like of the reaction tank.

The kind of stirring blade can be selected from the conventional blades, and the blade specifically includes a propeller blade, a screw blade, a turbine blade, a fan turbine blade, a disk turbine blade, a fardler blade, a fullzone blade and a maxblend blade.

The type of the polycondensation reaction tank used in the invention is not particularly limited, and the polycondensation reaction tank includes a vertical stirring polymerization tank, a horizontal stirring polymerization tank, and a thin film evaporation polymerization tank. The polycondensation reaction tank can be one tank, or can also be plural tanks in which the same kind or different kind of plural tanks are arranged in series. It is preferred that at the latter stage of polycondensation in which viscosity of a molten reaction is increased, a vertical stirring polymerization tank having thin film evaporation functions of excellent surface renewal properties, plug flow properties and self-cleaning properties is selected.

<Production Line Example>

The preferred embodiment of the production method of aliphatic polyester according to the invention using raw materials of succinic acid as the aliphatic dicarboxylic acid, 1,4-butanediol (hereinafter referred to as "BG") as the aliphatic diol and malic acid as the polyfunctional compound is described below by reference to reference numerals and signs in the accompanying drawings, but the invention is not construed as being limited to the embodiments shown in the drawings.

Figure 2:
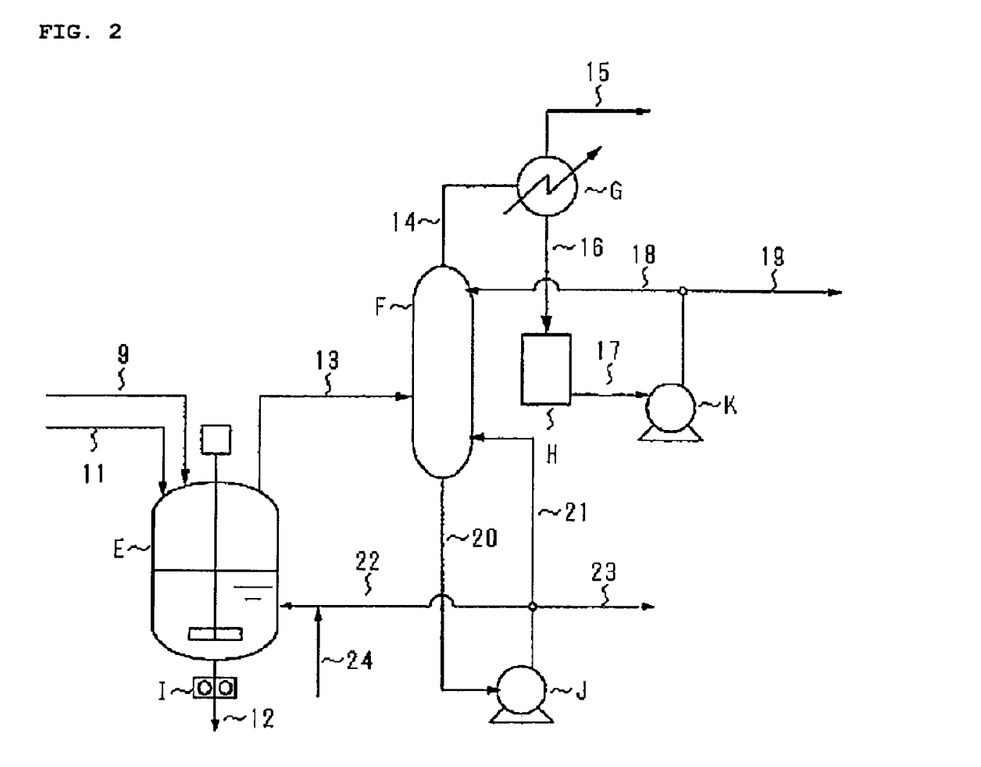
FIG. 2 is a schematic view showing one embodiment of an esterification reaction step in the production method of aliphatic polyester according to the invention.
Figure 3:
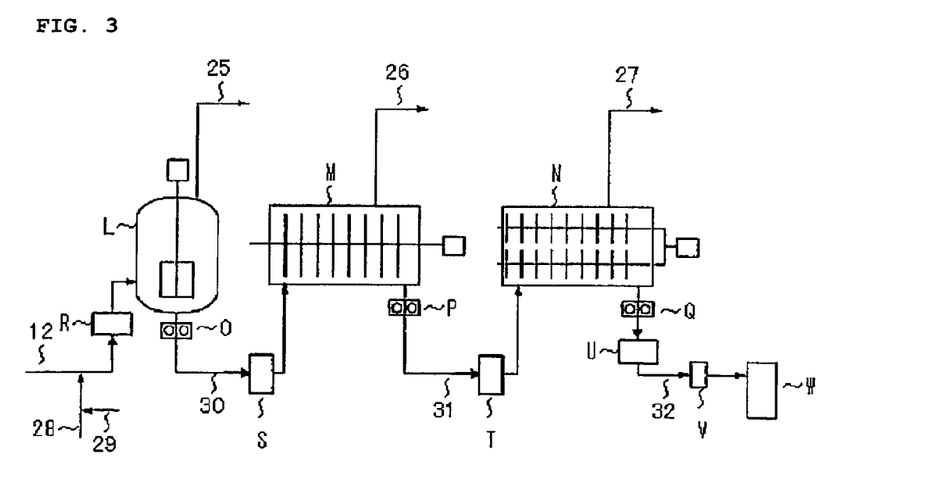
FIG. 3 is a schematic view showing one embodiment of a melt polycondensation reaction step in the production method of aliphatic polyester according to the invention.

FIG. 1 is a schematic view showing one embodiment of a slurry preparation step in the invention, FIG. 2 is a schematic view showing one embodiment of an esterification reaction step, and FIG. 3 is a schematic view showing one embodiment of a polycondensation reaction step in the invention.

In FIG. 1, succinic acid as a raw material is supplied to a slurry preparation tank having a stirring machine through a raw material supply line (1). 1,4-Butanediol is supplied to a slurry preparation tank (A) from a raw material supply line (2), and malic acid is supplied to the slurry preparation tank (A) from a raw material supply line (3). Using a pump (C), stirring and mixing are conducted while circulating slurry through a slurry extraction line (4) and a circulation line (5), thereby preparing slurry. The slurry prepared is transferred to a slurry storage tank (B) having a stirring machine through a slurry transfer line (6). The slurry transferred is continuously supplied to an esterification reaction tank (E) from a storage tank (B) through a slurry supply line (9) while conducting stirring and mixing while circulating the slurry through a slurry extraction line (7) and a circulation line (8) using a pump (D). Furthermore, malic acid as a raw material can be added as a solid to the slurry preparation tank from the raw material supply line (3), and can be added to the slurry supply line (9) as BG solution or BG slurry from a raw material supply line (10).

In FIG. 2, succinic acid and malic acid as raw materials are mixed with 1,4-butanediol in the slurry preparation step of FIG. 1 to form slurry, and the slurry is supplied to the esterification reaction tank (E) from the slurry supply line (9). In the case of adding a catalyst at the time of the esterification reaction, the catalyst is formed as a solution of BG in a catalyst preparation tank (not shown), and the solution can be supplied from a BG supply line (11). Alternatively, BG and the catalyst are supplied to a recirculation line (22) of recycled BG from BG and a catalyst supply line (24) to mix those, and the resulting mixture can be supplied to a liquid phase part of the esterification reaction tank (E).

Gas distilled from the esterification reaction tank (E) is separated into a high boiling component and a low boiling component in a rectification column (F) through a distillation line (13). In general, main component of the high boiling component is BG, and main component of the low boiling component is water and tetrahydrofuran (hereinafter sometimes referred to as "THF") which is a decomposition product of BG.

The high boiling component separated in the rectification column (F) is extracted from an extraction line (20), a part thereof is circulated to the esterification reaction tank (E) from a BG recirculation line (22) through a pump (J), and a part thereof is returned to a rectification column (F) from a circulation line (21). The excess is extracted to the outside from an extraction line (23). On the other hand, the low boiling component separated in the rectification column (F) is extracted from a gas extraction line (14), condensed in a condenser (G), and temporally stored in a tank (H) through a condensate line (16). A part of the low boiling component collected in a tank (H) is returned to the rectification column (F) through an extraction line (17), a pump (K) and a circulation line (18), and the remainder is extracted to the outside through an extraction line (19). The condenser (G) is connected to an exhaust apparatus (not shown) through a vent line (15). An esterification reaction product formed in the esterification reaction tank (E) is supplied to a first polycondensation reaction tank (L) through an extraction pump (I) and an extraction line (12) of the esterification reaction product.

In the step shown in FIG. 2, the BG supply line (24) is connected to the recirculation line (22), but those lines may independently be connected to a gas phase part of the esterification reaction tank (E). Furthermore, the raw material supply line (10) in FIG. 1 may be connected to a liquid phase part of the esterification reaction tank (E), or may be connected to a gas phase part thereof.

In the case that the catalyst is added to an esterification reaction product before a polycondensation tank, the catalyst is prepared in a given concentration in a catalyst preparation tank (not shown), connected to a BG supply line (28) through a catalyst supply line (29) in FIG. 3 to further dilute with BG, and then supplied to the extraction line (12) of an esterification reaction product shown in FIG. 2.

The esterification reaction product supplied to the first polycondensation reaction tank (L) through a filter (R) from the extraction line (12) of an esterification reaction product is polycondensed under reduced pressure to form a polyester low polymer, and the polyester low polymer is then supplied to a second polycondensation reaction tank (M) through an extraction gear pump (O), an extraction line (30) as an outlet flow passage, and a filter (S). In the second polycondensation reaction tank (M), polycondensation reaction generally further proceeds under pressure lower than in the first polycondensation reaction tank (L). A polycondensation reaction product obtained is supplied to a third polycondensation reaction tank (N) through an extraction gear pump (P), an extraction line (31) as an outlet flow passage, and a filter (T). The third polycondensation reaction tank (N) is constituted of plural stirring blade blocks, and is a horizontal reaction tank equipped with twin-screw self-cleaning type stirring blade. The polycondensation reaction product introduced into the third polycondensation reaction tank (N) from the second polycondensation reaction tank (M) through the extraction line (31) further undergoes polycondensation reaction, is extracted in a form of a molten strand from a die head (V) through an extraction gear pump (Q), a filter (U) and an extraction line (32) as an outlet flow passage, cooled with water or the like, and is cut with a rotary cutter (W) to obtain polyester pellets. Reference numerals (25), (26) and (27) are vent lines of the first polycondensation reaction tank (L), the second polycondensation reaction tank (M) and the third polycondensation reaction tank (N), respectively. The filters R, S, T and U are not always necessary to arrange all, and can appropriately be arranged considering foreign matter removal effect and operation stability.

<Properties of Aliphatic Polyester>

Inherent viscosity ([η] dL/g) of the aliphatic polyester of the invention is that the lower limit is preferably 1.3 dL/g, and particularly preferably 1.6, and the upper limit is preferably 2.8 dL/g, further preferably 2.5, and particularly preferably 2.3. Where the inherent viscosity is lower than the lower limit, it is difficult to obtain sufficient mechanical strength when a molded article is formed. Where the inherent viscosity exceeds the upper limit, melt viscosity at the time of molding is high, and it is difficult to be molded. It is preferred that a terminal carboxyl group concentration (equivalent/ton) of the aliphatic polyester of the invention is from 5 to 30. Thermal stability and hydrolysis resistance are better as the upper limit is low, but the lower limit is generally 5. The upper limit is further preferably 25. Where the concentration exceeds the upper limit, thermal stability is poor and thermal decomposition at the time of molding is increased.

It is preferred that color b value in Hunter chromatic coordinate of pellets of the aliphatic polyester produced by the production method is from 0.0 to 3.0. The upper limit is further preferably 2.5 or less. Where the value exceeds the upper limit, a molded article thereof takes on a yellow tinge, which may not be preferred. It is preferred that solution haze of the aliphatic polyester of the invention is from 0.01 to 2.5%. A transparent product is obtained as the lower limit is lower, which is preferred, but the lower limit is generally 0.01%. The upper limit is further preferably 2.2%. Where the solution haze exceeds the upper limit, turbidity generates in a molded article, and foreign matters are increased, which are not preferred. The solution haze used herein means turbidity in light path length of 10 mm of a solution having a sample concentration of 10% by weight using a mixed liquid of phenol/tetrachloroethane=3/2 (weight ratio) as a solvent, and is represented by %.

When the aliphatic polyester of the invention has the inherent viscosity of from 1.3 to 2.5 dL/g, the terminal carboxyl group concentration of from 5 to 30 equivalents/ton, the b value of from 0.0 to 0.3 and the solution haze of from 0.01 to 2.5%, the aliphatic polyester can be a raw material of a polyester molded article having good balance in moldability, thermal stability, color tone and transparency.

<Aliphatic Polyester Composition>

Aromatic-aliphatic copolymer polyester, aliphatic oxycarboxylic acid or the like may be compounded with the aliphatic polyester of the invention. Furthermore, other than a carbodiimide compound, a filler and a plasticizer used according to need, other biodegradable resins such as polycaprolactone, polyamide, polyvinyl alcohol and cellulose ester; animal/plant material fine powders such as starch, cellulose, paper, wood powder, chitin and/or chitosan, palm shell powder and walnut shell powder; or mixtures of those can be compounded in a range in which the advantage of the invention is not impaired. Furthermore, additives such as thermal stabilizers, plasticizers, lubricants, antiblocking agents, nucleating agents, inorganic fillers, colorants, pigments, ultraviolet absorbers and light stabilizers; modifiers; crosslinking agents; and the like may be contained for the purpose of adjusting properties and processability of a molded article. Those may be used in a range in which the advantage of the invention is not impaired, within the range of common sense of the person skilled in the art.

The production method of an aliphatic polyester composition of the invention is not particularly limited, and includes a method of melt mixing raw material chips of blended aliphatic polyesters with the same extruder, a method of melting with separate extruders and then mixing, and a method of mixing by kneading using ordinary kneading machines such as a single-screw extruder, a twin-screw extruder, a Banbury mixer, a roll mixer, Brabender Plastgraph or a kneader blender. Furthermore, it is possible to directly supply each raw material chip to a molding machine to prepare a composition, and simultaneously obtain its molded article.

<Uses of Aliphatic Polyester>

The aliphatic polyester of the invention and its composition have practical properties in thermal stability, tensile strength, tensile elongation and the like, and therefore can be utilized in molded articles such as films, laminate films, sheets, plates, stretched sheets, monofilaments, multifilaments, nonwoven fabric, flat yarns, staples, crimped yarns, ribbed tapes, split yarns, composite fibers, blow bottles and foams by the conventional plastic molding methods such as injection molding method, blow molding method and extrusion molding method.

EXAMPLES

The present invention is described in more detail below by reference to the Examples, but the invention is limited to the following Examples so long as it does not exceed the gist.

<Average Particle Diameter D(50) μm>

Average particle diameter was measured by dry method using a laser diffraction particle size distribution measuring device, MASTERSIZER 2000 (manufactured by Sysmex Corporation). A sample was placed on a sample tray, measurement for 2 seconds was carried out three times for one sample, and the average value was defined as an average particle diameter.

<D(90) μm>

From the particle size distribution obtained at the time of measurement of the average particle diameter, a particle diameter in 90% of an accumulated volume percentage curve, that is, a particle diameter corresponding to 90% of the total volume when accumulated from the side of small particle size, was defined as D(90).

<Slurry Precipitation Speed>

100 mL of slurry extracted from a slurry preparation step was placed in a 100 mL graduated cylinder having an inner diameter of 28 mm, and allowed to stand for 10 minutes in a room at a room temperature of 20° C. 10 minutes later, the state that the slurry in the graduated cylinder was separated into solid and liquid was observed. Volume of a transparent liquid part was measured with graduation of the cylinder, and a value obtained by dividing the value by the standing time was used as a slurry precipitation speed. Slurry having smaller value is good slurry which is difficult to be precipitated.

<Moisture Concentration in Slurry, ppm by Weight>

2 g of slurry and 2 g of tetrahydrofuran (THF) having the known moisture content were weighed and placed in a 5 mL vessel. After shaking the vessel for 1 minute, the vessel was allowed to stand, thereby conducting solid-liquid separation. The supernatant was collected with a microsyringe, and moisture concentration was measured with Karl Fischer moisture meter. A value obtained by subtracting moisture amount in THF from the moisture concentration obtained was used as moisture concentration (ppm by weight) to slurry weight.

<Terminal Carboxyl Group Concentration of Esterification Reaction Product (AV), Equivalent/Ton>

0.3 g of a sample was placed in 40 mL of benzyl alcohol, flowed by heating at 180° C. for 20 minutes. After cooling for 10 minutes, a value obtained by titrating with KOH/methanol solution of 0.1 mol·L$^{-1}$ was indicated by equivalent/ton.

<Inherent Viscosity (IV), DL/G>

Using Ubbellohde viscometer, inherent viscosity was obtained by the following manner. That is, a mixed solvent of phenol/tetrachloroethane (1/1 weight ratio) was used, and the number of seconds in dropping of a sample solution having a concentration of 0.5 g/dL or a solvent alone was measured at 30° C. The inherent viscosity was obtained by the following formula (3):

$$IV = ((1+4K_H \eta_{sp})^{0.5} - 1)/(2K_H C) \tag{3}$$

(wherein $\eta_{sp} = \eta/\eta_0 - 1$, is the number of seconds in dropping of a sample solution, $\eta_0$ is the number of seconds in dropping of a solvent, C is a sample solution concentration (g/dL), $K_H$ is a Huggins constant, and $K_H$ employs 0.33).

<Retention Time>

Retention time in the slurry step is represented by the sum of retention times of the slurry preparation step (A) and the slurry storage tank (B), respectively. The retention time in the slurry preparation tank is time required to stir and mix in the slurry preparation tank. The retention time in the slurry storage tank is a value obtained by dividing the amount of slurry in the slurry storage tank (the total amount of raw material supplied to the slurry preparation tank) by the amount continuously supplied to the esterification reaction tank (E).

Example 1

Preparation of Polymerization Catalyst 100 parts by weight of magnesium acetate tetrahydrate were placed in a glass eggplant-shaped flask equipped with a stirring apparatus, and 1,500 parts by weight of anhydrous ethanol (purity: 99% by weight or more) were further added thereto. Furthermore, 65.3 parts by weight of ethyl acid phosphate (mixed weight ratio of monoester form and diester form is 45:55) were added to the flask, followed by stirring at 23° C. 15 minutes later, after confirming that magnesium acetate was completely dissolved, 122 parts by weight of tetra-n-butyl titanate were added. Stirring was further continued for 10 minutes to obtain a uniform mixed solution. The mixed solution was transferred to an eggplant-shaped flask, and condensed in an oil bath at 60° C. under reduced pressure by an evaporator. One hour later, almost all of ethanol was distilled away to obtain a semitransparent viscous liquid. Temperature of the oil bath was further elevated to 80° C., and condensation was further conducted under reduced pressure of 5 Torr to obtain a viscous liquid. The resulting liquid catalyst was dissolved in BG and adjusted such that titanium atom content is 3.36% by weight. Storage stability of the catalyst solution in BG was good, and the catalyst solution stored at 40° C. in nitrogen atmosphere did not form precipitate for at least 40 days. Furthermore, pH of the catalyst solution was 6.3.

[Production Method of Aliphatic Polyester]

An aliphatic polyester resin was produced in the following manner by the slurry preparation step shown in FIG. 1, the esterification step shown in FIG. 2, and the polycondensation step shown in FIG. 3. Succinic acid containing 0.15% by weight of malic acid, having an average particle diameter of 330 μm and D(90)/D(50) of 1.9 was supplied to the slurry preparation tank (A) having a stirring machine through the raw material supply line (1). Subsequently, 1,4-butanediol was supplied to the slurry preparation tank (A) from the raw material supply line (2), and malic acid was supplied to the slurry preparation tank (A) from the raw material supply line (3), such that the 1,4-butanediol is 1.30 mol per 1.00 mol of succinic acid and the malic acid is 0.0033 mol to the whole amount. In this case, moisture content carried from raw materials was 300 ppm by weight based on the weight of the slurry. Using the pump (C), stirring and mixing were conducted for 1 hour or more while circulating the slurry through the slurry extraction line (4) and the slurry circulation line (5) to prepare the slurry. The whole amount of the slurry prepared was transferred to the slurry storage tank (B) having a stirring machine through the slurry supply line (6). The slurry transferred was stirred and mixed while circulating the slurry through the slurry extraction line (7) and the slurry circulation line (8) using the pump (D), and the slurry at 40° C. was continuously supplied to the esterification reaction tank (E) having a stirring machine, previously filled with an aliphatic polyester low molecular weight material (esterification reaction product) having the degree of esterification of 97% by weight in nitrogen atmosphere, through the slurry supply line (9) so as to be 45.5 kg/h. In this case, slurry temperature during the slurry preparation step was adjusted so as to be 40° C. by flowing hot water in a jacket. Moisture content in the slurry was adjusted by that slurry retention time in the slurry preparation step is within 24 hours in the total of the slurry preparation tank and the slurry storage tank. Preparation of slurry in the slurry preparation tank was that raw material supply, stirring and mixing, and transferring to slurry storage tank were periodically conducted in a range that the slurry in the slurry storage tank is not depleted. Moisture content in the slurry supplied and precipitation speed of slurry are shown in Table 1.

Inner temperature of the esterification reaction tank (E) was 230° C., and pressure therein was 101 kPa. Water and tetrahydrofuran formed, and excess BG were distilled from the distillation line (13), and separated into a high boiling component and a low boiling component in the rectification column (F). A part of the high boiling component at the bottom of the column after the system was stabilized was extracted to the outside through the extraction line (23) such that liquid level of the rectification column (F) is constant. On the other hand, the low boiling component mainly comprising water and THF was extracted in a form of gas from the top of the column, condensed in the condenser (G), and extracted to the outside from the extraction line (19) such that liquid level of the tank (H) is constant. Simultaneously, the whole amount of the bottom component (98% by weight or more is BG) of the rectification column (F) at 100° C. was supplied from the BG recirculation line (22), and in addition, the molar amount of BG equal to that of tetrahydrofuran formed in the esterification reaction tank was supplied from the raw material supply line (24), followed by adjusting such that the molar ratio of BG to succinic acid in the esterification reaction tank is 1.30.

The esterification reaction product formed in the esterification reaction tank (E) was continuously extracted from the extraction line (12) of esterification reaction product using the extraction pump (I), and liquid level was controlled such that average retention time in terms of succinic acid unit of an internal liquid of the esterification reaction tank (E) is 3 hours. The esterification reaction product extracted from the extraction line (12) was continuously supplied to the first polycondensation reaction tank (L). After the system was stabilized, 18 samples of the esterification reaction product were collected at the outlet of the esterification reaction tank (E) every 8 hours. Average value of terminal carboxyl concentration (AV) of those samples and width of deflection are shown in Table 1.

After preparing a catalyst solution by diluting the catalyst solution previously prepared by the above-described method with BG in the catalyst preparation tank such that concentration as titanium atom is 0.12% by weight, the catalyst solution was continuously supplied to the extraction line (12) of esterification reaction product at 1.4 kg/h through the catalyst supply line (29) and the supply line (28) (the catalyst was added to a liquid phase of a molten reactant). The supply amount was stable during the running period.

Inner temperature of the first polycondensation reaction tank (L) was 240° C., pressure was 2.67 kPa, and liquid level was controlled such that retention time is 120 minutes. Initial polycondensation reaction was conducted while extracting water, tetrahydrofuran and BG from the vent line (25) connected to a pressure reducing device (not shown). The molten reactant extracted was continuously supplied to the second polycondensation reactor (M).

Inner temperature of the second polycondensation reaction tank (M) was 240° C., pressure was 0.67 kPa, and liquid level was controlled such that retention time is 120 minutes. The polycondensation reaction was allowed to further proceed while extracting water, tetrahydrofuran and BG from the vent line (26) connected to a pressure reducing device (not shown). The polyester extracted was continuously supplied to the third polycondensation reactor (N) through the extraction line (31) by the extraction gear pump (P). Inner temperature of the third polycondensation reactor (N) was 240° C., pressure was 130 Pa, retention time was 120 minutes, and the polycondensation reaction was allowed to further proceed. The polyester obtained was continuously extracted in a strand form from the die head (V), and cut with a rotary cutter (W) to obtain pellets.

Slurry preparation, esterification reaction and polycondensation reaction were continuously conducted for 7 days. 18 samples of the aliphatic polyester were obtained by sampling every 8 hours after passing 16 hours from the start of reaction, and the inherent viscosity thereof was measured. The average value and width of deflection are shown in Table 1.

Example 2

Polyester was obtained in the same manner as in Example 1, except for using succinic acid having an average particle diameter of 74 μm and D(90)/D(50) of 2.0. The results obtained are shown in Table 1.

Example 3

Polyester was obtained in the same manner as in Example 1, except for using succinic acid having an average particle diameter of 158 μm and D(90)/D(50) of 1.8 and changing the temperature of slurry during the slurry preparation step to 70° C. The results obtained are shown in Table 1.

Example 4

Polyester was obtained in the same manner as in Example 1, except that the slurry was prepared such that BG is 1.50 mol per 1.00 mol of succinic acid. The results obtained are shown in Table 1.

Example 5

Polyester was obtained in the same manner as in Example 1, except for using succinic acid having D(90)/D(50) of 2.7 and changing the temperature of slurry during the slurry preparation step to 45° C. The results obtained are shown in Table 1.

Comparative Example 1

Polyester was obtained in the same manner as in Example 1, except for changing the slurry temperature during the slurry preparation step to 65° C. and changing the retention time in the preparation time to 30 hours. Moisture content in the slurry was 11.3% by weight. The results obtained are shown in Table 1. Moisture content in the slurry was high, it was difficult to stably supply the slurry to the reaction system, and deflection of the terminal carboxyl group concentration (AV) of the reaction product was large.

Comparative Example 2

Polyester was obtained in the same manner as in Example 1, except for changing the slurry temperature during the slurry preparation step to 10° C. The results obtained are shown in Table 1. BG was coagulated and the slurry could not be supplied to the reaction system.

Comparative Example 3

Polyester was obtained in the same manner as in Example 1, except for changing the slurry temperature during the slurry preparation step to 85° C. The results obtained are shown in Table 1. Precipitation speed of the slurry was large, and the slurry could not be supplied to the reaction system.

Comparative Example 4

Terephthalic acid having an average particle diameter of 75 μm and D(90)/D(50) of 1.60 was supplied to the slurry preparation tank (A) having a stirring machine through the raw material supply line (1). Subsequently, BG was supplied to the slurry preparation tank (A) from the raw material supply line (2) such that the BG is 1.60 mol per 1.00 mol of terephthalic acid. In this case, moisture content carried from raw materials was 300 ppm by weight based on the weight of the slurry. Using the pump (C), stirring and mixing were conducted for 2 hour or more while circulating the slurry through the slurry extraction line (4) and the slurry circulation line (5) to prepare the slurry. The whole amount of the slurry prepared was transferred to the slurry storage tank (B) having a stirring machine through the slurry supply line (6). The slurry transferred was stirred and mixed while circulating the slurry through the slurry extraction line (7) and the slurry circulation line (8) using the pump (D), and the slurry at 30° C. was continuously supplied to the esterification reaction tank (E) having a stirring machine, previously filled with an aromatic polyester low molecular weight material (esterification reaction product) having the degree of esterification of 99% by weight in nitrogen atmosphere, through the slurry supply line (9) so as to be kg/h. Simultaneously, the bottom component (98% by weight or more is BG) in the rectification column (F) of 185° C. was supplied from the BG recirculation line (22) at kg/h, and 6.0% by weight BG solution of tetrabutyl titanate of 65° C. was supplied as a catalyst from the catalyst supply line (24) at 130 g/h (40 ppm by weight per theoretical polymer yield).

Slurry temperature during the slurry preparation step was adjusted so as to be 30° C. by flowing hot water in a jacket. Preparation of slurry in the slurry preparation tank was that raw material supply, stirring and mixing, and transferring to slurry storage tank were periodically conducted such that the slurry in the slurry storage tank is not depleted. Moisture content in the slurry supplied and precipitation speed of slurry are shown in Table 1.

Inner temperature of the esterification reaction tank (E) was 230° C., and pressure therein was 78 kPa. Water and tetrahydrofuran formed, and excess BG were distilled from the distillation line (13), and separated into a high boiling component and a low boiling component in the rectification column (F). A part of the high boiling component at the bottom of the column after the system was stabilized was extracted to the outside through the extraction line (23) such that liquid level of the rectification column (F) is constant. On the other hand, the low boiling component mainly comprising water and THF was extracted in a form of gas from the top of the column, condensed in the condenser (G), and extracted to the outside from the extraction line (19) such that liquid level of the tank (H) is constant. Simultaneously, the whole amount of the bottom component (98% by weight or more is BG) of the rectification column (F) of 100° C. was supplied from the BG recirculation line (22), and in addition, the molar amount of BG equal to that of tetrahydrofuran formed in the esterification reaction tank was supplied from the BG supply line (24), followed by adjusting such that the molar ratio of BG to terephthalic acid in the esterification reaction tank is 3.50.

The esterification reaction product formed in the esterification reaction tank (E) was continuously extracted from the extraction line (12) of esterification reaction product using the extraction pump (I), and liquid level was controlled such that average retention time in terms of terephthalic acid unit of an internal liquid of the esterification reaction tank (E) is 3.2 hours. The esterification reaction product extracted from the extraction line (12) was continuously supplied to the first polycondensation reaction tank (L). After the system was stabilized, 18 samples of the esterification reaction product were collected at the outlet of the esterification reaction tank (E). Average value of terminal carboxyl concentration (AV) of those samples and width of deflection are shown in Table 1.

Inner temperature of the first polycondensation reaction tank (L) was 240° C., pressure was 2.1 kPa, and liquid level was controlled such that retention time is 120 minutes. Initial polycondensation reaction was conducted while extracting water, tetrahydrofuran and BG from the vent line (25) connected to a pressure reducing device (not shown). The molten reactant extracted was continuously supplied to the second polycondensation reaction tank (M).

Inner temperature of the second polycondensation reaction tank (M) was 240° C., pressure was 0.4 kPa, and liquid level was controlled such that retention time is 85 minutes. The polycondensation reaction was allowed to further proceed while extracting water, tetrahydrofuran and BG from the vent line (26) connected to a pressure reducing device (not shown). The polyester obtained was continuously supplied to the third polycondensation reactor (N) through the extraction line (31) by the extraction gear pump (P). Inner temperature of the third polycondensation reactor (N) was 240° C., pressure was 130 Pa, retention time was 60 minutes, and the polycondensation reaction was allowed to further proceed. The polyester obtained was continuously extracted in a strand form from the die head (V), and cut with a rotary cutter (W) to obtain pellets. Slurry preparation, esterification reaction and polycondensation reaction were continuously conducted for 7 days. 18 samples of the polyester were obtained by sampling every 8 hours after passing 16 hours from the start of reaction, and the inherent viscosity thereof was measured. The average value and width of deflection are shown in Table 1.

Comparative Example 5

Polyester was obtained in the same manner as in Comparative Example 4, except for changing the temperature of slurry during the slurry preparation step to 85° C. The results obtained are shown in Table 1.

In Comparative Examples 4 and 5, the slurry of the aromatic carboxylic acid (terephthalic acid) and BG had low precipitation speed, and it was easy to stably supply the slurry to the reaction system.

While the invention has been described in detail and with reference to specific embodiments thereof, it will be apparent to one skilled in the art that various changes and modifications can be made therein without departing from the spirit and scope thereof.

This application is based on Japanese Patent Application (Patent Application No. 2008-088314) filed on Mar. 28, 2008, the entire contents thereof being hereby incorporated by reference.

INDUSTRIAL APPLICABILITY

According to the present invention, stable production can be achieved at the time of the production of aliphatic polyester, and a product having less deflection of quality can be obtained. Accordingly, it can be expected that use of aliphatic polyester is increased. Therefore, the industrial value of the present invention is remarkable.

The invention claimed is:

1. A continuous method of producing an aliphatic polyester, comprising, in the following order:
   (I) mixing an aliphatic dicarboxylic acid and an aliphatic diol, to obtain a slurry;
   (II) esterifying the dicarboxylic acid and aliphatic diol, to produce an esterification reaction product; and
   (III) polycondensing the esterification reaction product, thereby obtaining the aliphatic polyester,
   wherein, during (I), a temperature range of the slurry is from the coagulation point of the aliphatic diol to 80° C., and a moisture content in the slurry is from 0.01 to 10% by weight, based on a total weight of the slurry,
   wherein the aliphatic diol comprises 70 mol % or more of 1,4-butanediol, and the aliphatic dicarboxylic acid comprises 70 mol % or more of succinic acid, and
   wherein the aliphatic dicarboxylic acid in the slurry is in the form of particles having an average particle diameter D(50) and particle diameter D(90) in 90% of an accumulated volume percentage curve of particle diameter that satisfy formulae (1) and (2):

$$1 \text{ μm} \leq D(50) \leq 500 \text{ μm} \tag{1}$$

$$D(90)/D(50) \leq 2.5 \tag{2}$$

2. The method of claim 1, wherein a molar ratio of the aliphatic diol to the aliphatic dicarboxylic acid in the slurry is from 0.8 to 2.0.

TABLE 1

|  |  | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|---|
| Molar ratio of diol/dicarboxylic acid of slurry | mol/mol | 1.3 | 1.3 | 1.3 | 1.5 | 1.3 | 1.3 | 1.3 | 1.3 | 1.6 | 1.6 |
| Average particle diameter D(50) of succinic acid | μm | 330 | 74 | 158 | 330 | 330 | 330 | 330 | 330 | 75 | 75 |
| D(90)/D(50) | — | 1.9 | 2.0 | 1.8 | 1.9 | 2.7 | 1.9 | 1.9 | 1.9 | 2.2 | 2.2 |
| Slurry temperature | ° C. | 40 | 40 | 70 | 40 | 45 | 65 | 10 | 85 | 30 | 85 |
| Moisture content in slurry | wt % | 0.8 | 0.8 | 1.4 | 1 | 0.9 | 11.3 | 0.4 | 2 | 0.1 | 0.1 |
| Slurry precipitation speed | mL/10 min | 10 | 2 | 8 | 12 | 18 | 22 | — | 46 | 1 | 2 |
| AV of esterification reaction product | μeq/g | 835 ± 15 | 805 ± 5 | 823 ± 13 | 750 ± 20 | 840 ± 30 | 910 ± 110 | — | — | 345 ± 15 | 300 ± 10 |
| Inherent viscosity of polyester | dL/g | 1.81 ± 0.02 | 1.81 ± 0.05 | 1.81 ± 0.10 | 1.80 ± 0.05 | 1.80 ± 0.05 | 1.76 ± 0.11 | — | — | 0.84 ± 0.02 | 0.85 ± 0.01 |

—: Measurement impossible

3. The method of claim 1, wherein the aliphatic diol comprises 90 mol % or more of 1,4-butanediol, and the aliphatic dicarboxylic acid comprises 90 mol % or more of succinic acid.

4. The method of claim 2, wherein the aliphatic diol comprises 90 mol % or more of 1,4-butanediol, and the aliphatic dicarboxylic acid comprises 90 mol % or more of succinic acid.

5. The method of claim 1, wherein the moisture content in the slurry is from 0.01 to 5% by weight, based on a total weight of the slurry.

6. The method of claim 1, wherein the moisture content in the slurry is from 0.05 to 5% by weight, based on a total weight of the slurry.

7. The method of claim 1, wherein the moisture content in the slurry is from 0.05 to 2% by weight, based on a total weight of the slurry.

8. The method of claim 1, wherein the moisture content in the slurry is from 0.1 to 1.5% by weight, based on a total weight of the slurry.

9. The method of claim 1, wherein the moisture content in the slurry is from 0.1 to 1% by weight, based on a total weight of the slurry.

10. The method of claim 1, wherein the temperature range of the slurry is from the coagulation point of the aliphatic diol to 70° C.

11. The method of claim 1, wherein the temperature range of the slurry is from the coagulation point of the aliphatic diol to 60° C.

12. The method of claim 1, wherein the temperature range of the slurry is from the coagulation point of the aliphatic diol to 50° C.

13. The method of claim 8, wherein the temperature range of the slurry is from the coagulation point of the aliphatic diol to 60° C.

14. The method of claim 8, wherein the temperature range of the slurry is from the coagulation point of the aliphatic diol to 50° C.

15. The method of claim 13, wherein the aliphatic diol comprises 90 mol % or more of 1,4-butanediol, and the aliphatic dicarboxylic acid comprises 90 mol % or more of succinic acid.

16. The method of claim 13, wherein the aliphatic dicarboxylic acid particles have an average particle diameter D(50) and particle diameter D(90) in 90% of an accumulated volume percentage curve of particle diameter that satisfy formulae (1) and (2):

$$10 \ \mu m \leq D(50) \leq 400 \ \mu m \quad (1)$$

$$1.2 \leq D(90)/D(50) \leq 2.3 \quad (2).$$

17. The method of claim 13, wherein the aliphatic dicarboxylic acid particles have an average particle diameter D(50) and particle diameter D(90) in 90% of an accumulated volume percentage curve of particle diameter that satisfy formulae (1) and (2):

$$30 \ \mu m \leq D(50) \leq 200 \ \mu m \quad (1)$$

$$1.2 \leq D(90)/D(50) \leq 2.0 \quad (2).$$

18. The method of claim 13, wherein the aliphatic dicarboxylic acid particles have an average particle diameter D(50) and particle diameter D(90) in 90% of an accumulated volume percentage curve of particle diameter that satisfy formulae (1) and (2):

$$30 \ \mu m \leq D(50) \leq 100 \ \mu m \quad (1)$$

$$1.2 \leq D(90)/D(50) \leq 1.8 \quad (2).$$

19. The method of claim 15, wherein the aliphatic dicarboxylic acid particles have an average particle diameter D(50) and particle diameter D(90) in 90% of an accumulated volume percentage curve of particle diameter that satisfy formulae (1) and (2):

$$10 \ \mu m \leq D(50) \leq 400 \quad (1)$$

$$1.2 \leq D(90)/D(50) \leq 2.3 \quad (2).$$

* * * * *